United States Patent [19]

Wilson

[11] 4,032,109

[45] June 28, 1977

[54] TENSIONING DEVICE

[76] Inventor: Toney H. Wilson, Rte. 2, Box 302D, Sarasota, Fla. 33577

[22] Filed: June 24, 1976

[21] Appl. No.: 699,781

[52] U.S. Cl. .............................................. 254/69
[51] Int. Cl.² ......................................... B66F 1/00
[58] Field of Search ............................ 254/68–70, 254/73, 83, 60, 25, 106–107

[56] References Cited

UNITED STATES PATENTS

| 1,018,882 | 2/1912 | Davidson | 254/70 |
| 1,130,147 | 3/1915 | Coles | 254/25 |
| 3,492,854 | 2/1970 | Eppler | 254/106 |

Primary Examiner—Al Lawrence Smith
Assistant Examiner—Robert C. Watson
Attorney, Agent, or Firm—Duckworth, Hobby, Orman, Allen & Pettis

[57] ABSTRACT

A hand-held and hand-operated tensioning device of the type primarily intended for use in stretching fence wire is disclosed. The device basically comprises a stationary hook suitable for engaging an attachment point, such as an eye placed on a fence post, and a movable hook to which the material being stretched can be attached. A trigger-operated mechanism is provided to advance the movable hook in the direction of the stationary hook, thereby tensioning and stretching material, such as fence wire, attached to the movable hook. The device is also useful as a clamp.

9 Claims, 5 Drawing Figures

U.S. Patent
June 28, 1977
4,032,109
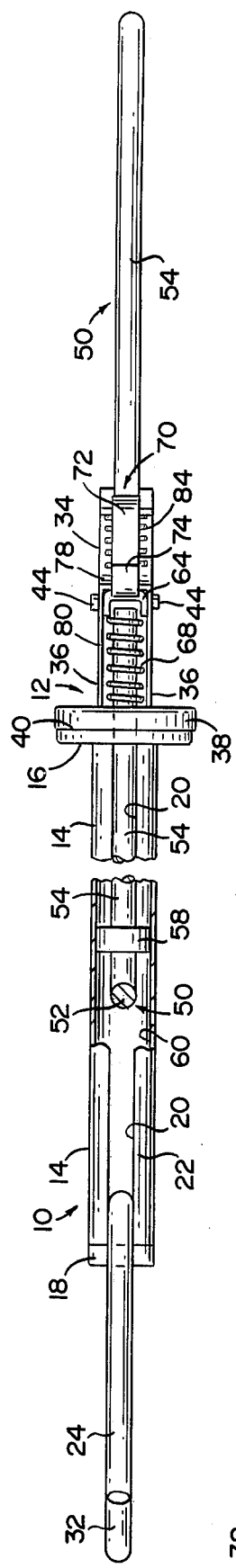
FIG. 1
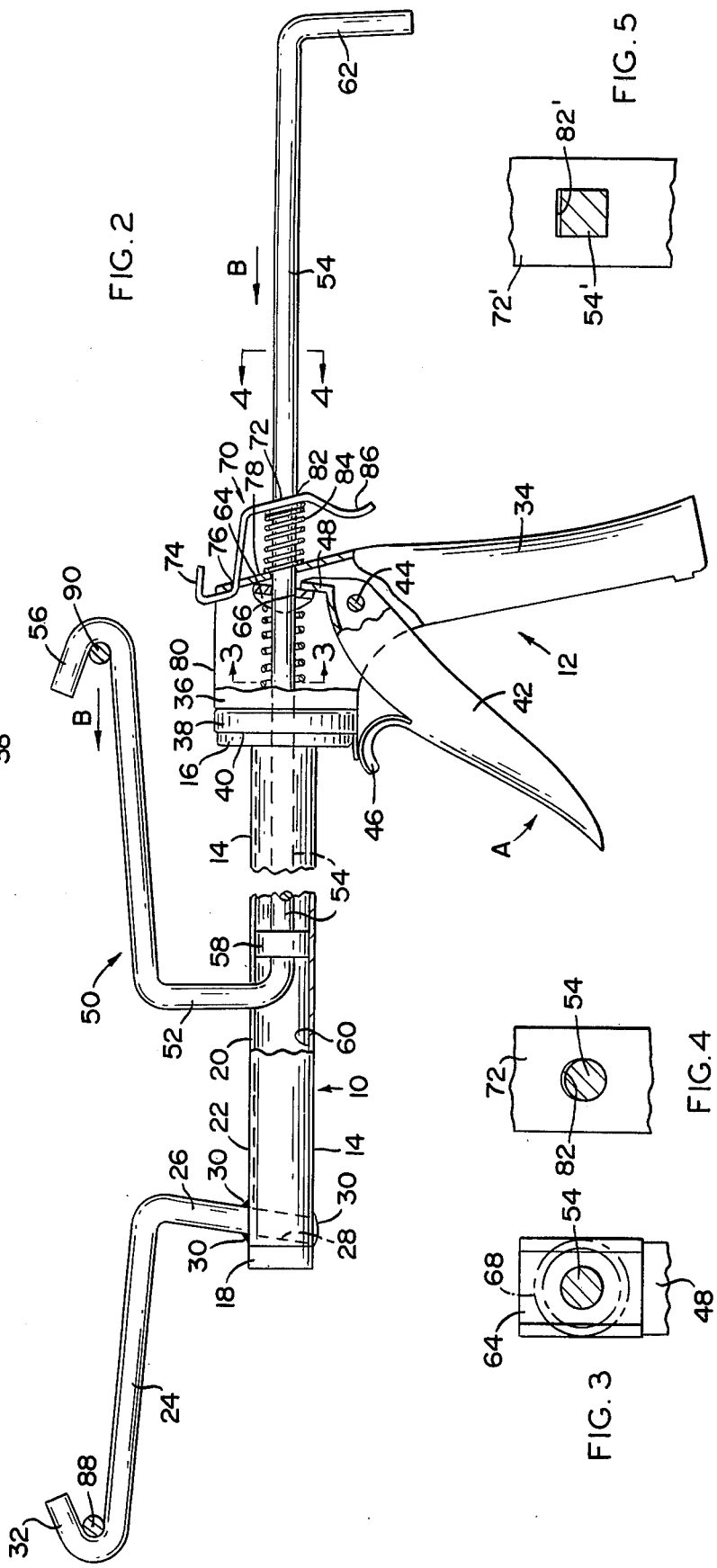
FIG. 2
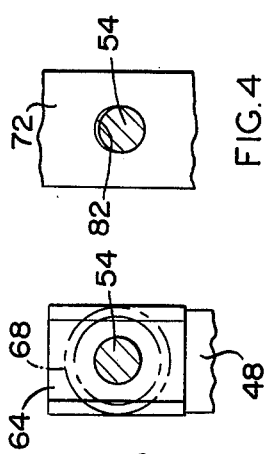
FIG. 3
FIG. 4
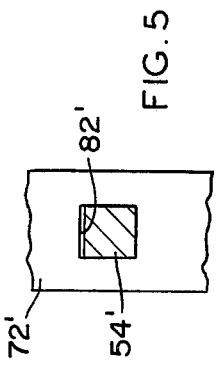
FIG. 5

TENSIONING DEVICE

BACKGROUND OF THE INVENTION

1. Field of the Invention

The present invention relates to a hand-operated tensioning device of the type primarily intended for use in stretching fence wire. The tensioning device of the present invention may also be used as an adjustable clamp.

2. Description of the Prior Art

Anyone who has ever been seriously involved with the businesses of farming or raising livestock can certainly appreciate the importance of maintaining secure fencing around his property. Of course, not only must such fencing be installed in the first place, but also it must be continually cared for, maintained and replaced. In order to install and maintain a secure fence, it is necessary that the fencing material be tensioned, or stretched, between the supporting posts. Stretching the fabric not only results in a more secure fence construction, but also serves to conserve fencing material by insuring that excess material is not utilized.

Numerous devices for stretching the fence fabric are known in the prior art. Such tensioning devices range in complexity from relatively simple turnbuckles to complicated, compound pully systems. However, with the possible exception of turnbuckle-type constructions, most fence stretchers that are commerically available today share certain common disadvantages.

In the first place, since relatively high tensioning forces must be applied to the fence fabric, present stretching devices are generally of a bulky construction. It is quite often necessary to utilize two man teams to operate them and to transport the devices in the back of a light truck. Most commercially available devices today utilize carefully machined rachet and lever constructions to apply the necessary tensioning forces to the fence fabric. However, of perhaps greatest concern, is the fact that both the bulk and the relative complexity of current fence stretching devices significantly increases their cost to the end user.

Accordingly, it is apparent that there is a great need in the art for a tensioning device which can be easily transported and utilized in the field by one person. Obviously then, such a device must be of relatively lightweight construction. But, at the same time, the device must be capable of exerting sufficient force at properly tension and stretch fencing material. It would also be desirable if such a device were of a relatively simple construction to simplify the use and maintenance of the device, and also to provide a relatively low cost item.

SUMMARY OF THE INVENTION

The present invention relates to a tensioning device of the type primarily intended for use in stretching fence wire. Additionally, as will be set forth in greater detail hereinafter, the device of the present invention may also be utilized as an adjustable clamp. In developing the device of the present invention, four factors were of prime importance: portability, ease of use, low cost and durability.

The tensioning device basically comprises a body having a handle-like gripping portion formed thereon. A trigger is movably connected to the body and is operable when the device is held by the hand-gripping portion. A stationary hook is attached to the front of the device. When using the device, this hook is preferably attached to a fixed object, such as a staple or an eye mounted in the fence post. It is, of course, possible to attach a length of strung fencing material to this stationary hook.

The device further includes a movable tensioning means comprising a second hook, the base of which is disposed within the body device. This movable tensioning means preferably comprises a substantially Z-shaped hook, and it is the length of the base of the Z-shape which extends through the device body, through the hand-gripping portion, and out the after end of the device.

The movable tensioning means is operatively connected to the trigger by a prime mover, whereby depressing the trigger causes linear advancement of the movable tensioning means toward the stationary hook. In the preferred embodiment each depression of the trigger advances the movable tensioning means approximately ¼ inch toward the stationary hook.

The prime mover means of the invention comprises an apertured plate mounted within the hand-gripping portion in abutting relation to tips formed at the top of the trigger. The long base of the Z-shaped rod forming the movable tensioning means extends through the aperture and is frictionally engaged by portions of the plate defining the aperture's perimeter. Additionally, biasing means are disposed within the hand-gripping portion to urge the apertured plate into engagement with the trigger tips.

The Z-shaped hook of the movable tensioning means extends upwardly from the body of the device through a keyway slot longitudinally formed along the top of the body.

The device of the present invention further comprises anti-reverse means operatively mounted on the after side of the hand-gripping portion. This anti-reverse means comprises an arm means hingedly attached to the top of the hand-gripping portion. An aperture is formed in the arm, and the base of the Z-shaped rod extends through that aperture. The arm is urged rearwardly into gripping engagement with the rod's base by anti-reverse biasing means disposed between the hand-gripping portion and the arm. As suggested by the terminology used to define this element, the purpose of the anti-reverse means is to prevent inadvertent movement of the movable tensionsing means away from the stationary hook. In fact, only by depressing the arm with sufficient force to overcome the anti-reverse biasing means can the tensioning means be moved rearwardly in preparation for use. For convenience in performing this "cocking" operation, the extreme after end of the movable tensioning means is preferably deformed at a substantially 90° angle to the device body. This deformed portion then acts essentially as a handle with which to pull the tensioning means rearwardly when the anti-reverse means is disengaged as above-described.

The operation of the tensioning device for the purpose of stringing a strand of barbed wire, for example, is as follows. First, the movable tensioning means is "cocked" or moved to its extreme rearward position by depressing the arm of the anti-reverse means and pulling the tensioning means rearwardly. This rearward motion is limited by the upstanding Z-shaped hook's abutting a portion of the device body. The stationary hook is then attached to a predetermined fixed object, and the strand of barbed wire is secured to the top of the Z-shaped hook forming at the forward end of the movable tensioning means. The trigger is then sequentially depressed and released. As stated above, each depression of the trigger urges the prime mover plate forwardly. Inasmuch as the prime mover plate frictionally grips the rod forming the base of the tensioning means, this results in corresponding forward motion of the movable tensioning means. When released, the trigger is returned to its "ready" position by virtue of the biasing means operatively disposed between a portion of the hand-gripping compartment and prime mover plate. The trigger is alternately squeezed and released until the strand of barbed wire is sufficiently stretched. The strand is then secured to the fence post, and the device is disengaged.

It should be obvious that the tensioning device of this invention may also be used as a clamp simply be placing the objects to be clamped together between corresponding portions of the stationary hook and the movable tensioning means. The trigger is then alternately depressed and released as set forth above until the desired clamping pressure is obtained.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a top plan view of the device, partially in section to show interior detail.

FIG. 2 is a side elevational view of the device shown in FIG. 1, partially in section to show interior detail.

FIG. 3 is a sectional view taken along line 3—3 of FIG. 2.

FIG. 4 is a sectional view taken along line 4—of FIG. 2.

FIG. 5 is a sectional view similar to that of FIG. 4 showing an alternative cross-sectional configuration of the movable tensioning means.

Similar reference characters refer to similar parts throughout the several views of the drawings.

DETAILED DESCRIPTION

The tensioning device of the present invention basically comprises body means generally indicated as 10 and hand-gripping portion formed thereon and attached thereto, generally indicated as 12. Body means 10 extends forwardly of hand-gripping portion 12 and comprises a tube 14. A tube attachment plate 16 is formed at the after end of tube 14, and a plug 18 closes the forward end of tube 14. As will be described in greater detail hereinafter, a keyway 20 comprising a longitudinal slot is formed in top 22 of tube 14.

A stationary hook means comprising a substantially J-shaped hook 24 is fixedly attached to the forward end of tube 14 by passing top portion 26 of J hook through a correspondingly configured transverse aperture 28. Fixed attachment may be completed by any suitable means such as, for example, welding as indicated at 30. It should further be noted that in the preferred embodiment of FIGS. 1 and 2, open end 32 of J hook 24 faces in the direction of hand-gripping portion 12.

As best seen in FIG. 2, hand-gripping portion 12 comprises a handle 34 and a casing 36. Casing attachment plate 38 is formed at the forward part of casing 36 and is fixedly attached to tube attachment plate 16 at 40 by any suitable means such as, for example, welding.

A trigger 42 is hingedly connected to handle 34 by any suitable fastening means such as, for example, pin 44. A finger guard 46 is formed on trigger 42 and at least one tip 48 is formed at the top of trigger 42 and disposed within casing 36. As will be discussed in greater detail hereinafter, trigger 42 is operated by being depressed in the direction of arrow A, as best seen in FIG. 2.

Movable tensioning means, generally indicated as 50, is partially disposed within tube 14 and casing 36. As best seen in FIG. 2, tensioning means 50 comprising a substantially Z-shaped rod 52, base 54 of which is elongated. As indicated by arrows B in FIG. 2 and as will be described in greater detail hereinafter, tensioning is effecting by depressing trigger 42 resulting in forward movement of rod 52.

As most clearly seen in FIG. 2, open end 56 of rod 52 extends upwardly from tube 14 through keyway 20. A guide plug 58 is fixedly attached to the forward end of rod base 54 so as to stabilize the movement of tensioning means 50 along the inside 60 of tube 14. Finally, a rod gripping portion 62 is formed at the after end of rod 52 by deforming a segment of base 54 at a substantially 90° angle to tube 14.

Movement of tensioning means 50 in the direction of arrows B is actually accomplished by virtue of the forces exerted by a prime mover means comprising plate means 64 mounted within casing 36. An aperture 66 is formed in plate means 64 to permit passage of base 54 therethrough. The shape of aperture 66 corresponds to the cross-section of base 54 and is slightly larger than said cross-section so as to frictionally grip base 54 when positioned as indicated in FIG. 2.

The position of plate 64 illustrated in FIG. 2 is maintained by virtue of the abutting relationship between plate 64 and tip 48. This abutting relationship is accomplished by the biasing force of coil spring 68 disposed in surrounding relationship to base 54 between an interior portion of casing 36 and forward portions of plate 64. By virtue of these structural relationships, when trigger 42 is depressed in the direction of arrow A, tip 48 will urge plate 64 and base 54 gripped thereby forwardly, overcoming the biasing force of coil spring 68. This will obviously result in movement of open end 56 in the direction of arrows B. Similarly, when pressure is released from trigger 42, coil spring 68 will urge plate 64 rearwardly. Inasmuch as aperture 66 is slightly larger than the cross-section of base 54, plate 64 will slide rearwardly, without moving tensioning means 50.

Tensioning means 50 is further held against rearward motion by anti-reverse means generally indicated as 70 in FIG. 2. Anti-reverse means 70 comprises arm means 72 which is hingedly attached in casing 36 by passing end 74 of arm 72 through slot formed in after end 78 of casing 36. Arm end 74 then extends upwardly above open top 80 of casing 36. An anti-reverse aperture 82 if formed in arm 72 so as to permit passage of base 54 therethrough. The aperture 82 is slightly larger than the cross-section of base 54 so as to grippingly engage said base. This gripping engagement is maintained by the biasing action of anti-reverse spring 84 disposed in surrounding relationship to base 54 between after end 78 and arm 72. Movable tensioning means 50 can be disengaged from the gripping force of anti-reverse means 70 by depressing curved thumb portion 86 of arm 72. Since anti-reverse aperture 82 is slightly larger than the cross-section of base 54, depressing curved thumb portion 86 allows base 54, and therefore tensioning means 50, to be pulled rearwardly, or in the opposite direction indicated by arrows B.

To use the preferred embodiment of the invention, anti-reverse means 70 is disengaged by depressing curved thumb portion 86, and movable tensioning means 50 is pulled to its extreme rear position. J-shaped hook 24 is then attached to fixed object 88, and movable tensioning means 50 is attached to the strand of wire 90 to be stretched. Trigger 42 is then successively depressed and released resulting in successive forward movement of tensioning means 50 in the direction of arrows B as described above. When wire 90 has been sufficiently tensioned, its free end is attached to a stationary point, such as fixed object 88, and the device is disengaged.

While the above description and the views of FIG. 1-4 have been given with specific regard to a movable tensioning means 50 defining a substantially circular cross-section, it is to be understood that virtually any shape may be used. The view of FIG. 5 illustrates, for example, the use of a movable tensioning means having a substantially square cross-section. The elements shown in FIG. 5 correspond to those of FIG. 4 and have been designated by the addition of a prime mark.

It is further to be understood that the device hereinabove described and illustrated may also be utilized for clamping procedures. In such use, the materials to be clamped are placed between corresponding portions of stationary J-shaped hook 24 and movable Z-shaped rod 52. Rod 52 is then advanced toward hook 24 as previously described until the desired clamping force is achieved.

It will thus be seen that the object set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention in which, as a matter of language, might be said to fall therebetween.

Now that the invention has been described, What is claimed is:

1. A tensioning device of the type primarily intended for use in stretching fence wire, said device comprising: body means including a hand-gripping portion attached thereto; trigger means movably connected in operative relation to said hand-gripping portion; stationary hook means formed on said body means; movable tensioning means at least partially disposed within said body means; said body means further comprising a tube portion extending forward of said hand-gripping portion; said tube portion having a keyway formed along its longitudinal dimension so as to permit a predetermined segment of said movable tensioning means to extend therethrough; and prime mover means disposed within said body means in operative, interconnecting relationship between said trigger means and said movable tensioning means, whereby actuation of said trigger means will cause said prime mover means to advance said movable tensioning means along a predetermined path toward said stationary hook means.

2. A device as in claim 1, wherein said stationary hook means comprises a substantially J-shaped hook fixedly attached to said body means and oriented so that the open end of said J-shape faces in the direction of said hand-gripping portion.

3. A device as in claim 1 wherein said movable tensioning means comprises a rod having a substantially Z-shaped hook formed on one end thereof, the base of said Z-shaped being of a greater longitudinal dimension than the top of said Z-shape, and said base being at least partially disposed within said body in selectively movable engagement with said prime mover means.

4. A device as in claim 1 wherein said prime mover means comprises apertured plate means mounted within said hand-gripping portion in abutting relation to predetermined portions of said trigger means; and biasing means disposed within said hand-gripping portion so as to urge said apertured plate means away from said stationary hook means, said movable tensioning means extending through said aperture in frictionally engaging relationship to at least portions of said plate means defining the perimeter of said aperture.

5. A device as in claim 4 wherein said movable tensioning means is of a predetermined cross-sectional configuration and said aperture is of a concurrent shape, said aperture being of relatively greater area than said cross-sectional configuration.

6. A device as in claim 1 wherein said trigger means is pivotally connected to said hand-gripping portion; said trigger means further comprising finger guard means formed thereon in abutting relation to said body means when said trigger means is in the ready position, and tip means formed thereon in engaging relationship to said prime mover means, whereby actuation of said trigger means will cause said prime mover means to urge said movable tensioning means toward said stationary hook means.

7. A device as in claim 1 further comprising anti-reverse means operatively mounted on said hand-gripping portion in operative engagement with said movable tensioning means, said anti-reverse means comprising arm means including an aperture formed therethrough hingedly attached to said hand-gripping portion and anti-reverse biasing means operatively disposed between said hand-gripping portion and said arm means to urge said arm means away from said stationary hook means and into gripping engagement with said movable tensioning means, said movable tensioning means extending through said aperture formed in said arm means, whereby said movable tensioning means will only move toward said stationary hook unless said anti-reverse means is released.

8. A device as in claim 7 wherein said movable tensioning means if of a predetermined cross-sectional configuration and said aperture is of a concurrent shape, said aperture being of relatively greater area than said cross-sectional configuration.

9. A device as in claim 1 wherein said movable tensioning means comprises a rod having a substantially Z-shaped hook formed on one end thereof and being oriented so that the open top portion of said Z-shape faces in the direction of said stationary hook means.

* * * * *

UNITED STATES PATENT AND TRADEMARK OFFICE
CERTIFICATE OF CORRECTION

PATENT NO. : 4,032,109
DATED : June 28, 1977
INVENTOR(S) : Toney H. Wilson

It is certified that error appears in the above-identified patent and that said Letters Patent are hereby corrected as shown below:

Column 6, line 55, after "hook" insert --means--.

Signed and Sealed this

Twentieth Day of September 1977

[SEAL]

Attest:

RUTH C. MASON
Attesting Officer

LUTRELLE F. PARKER
Acting Commissioner of Patents and Trademarks